Patented Jan. 21, 1930

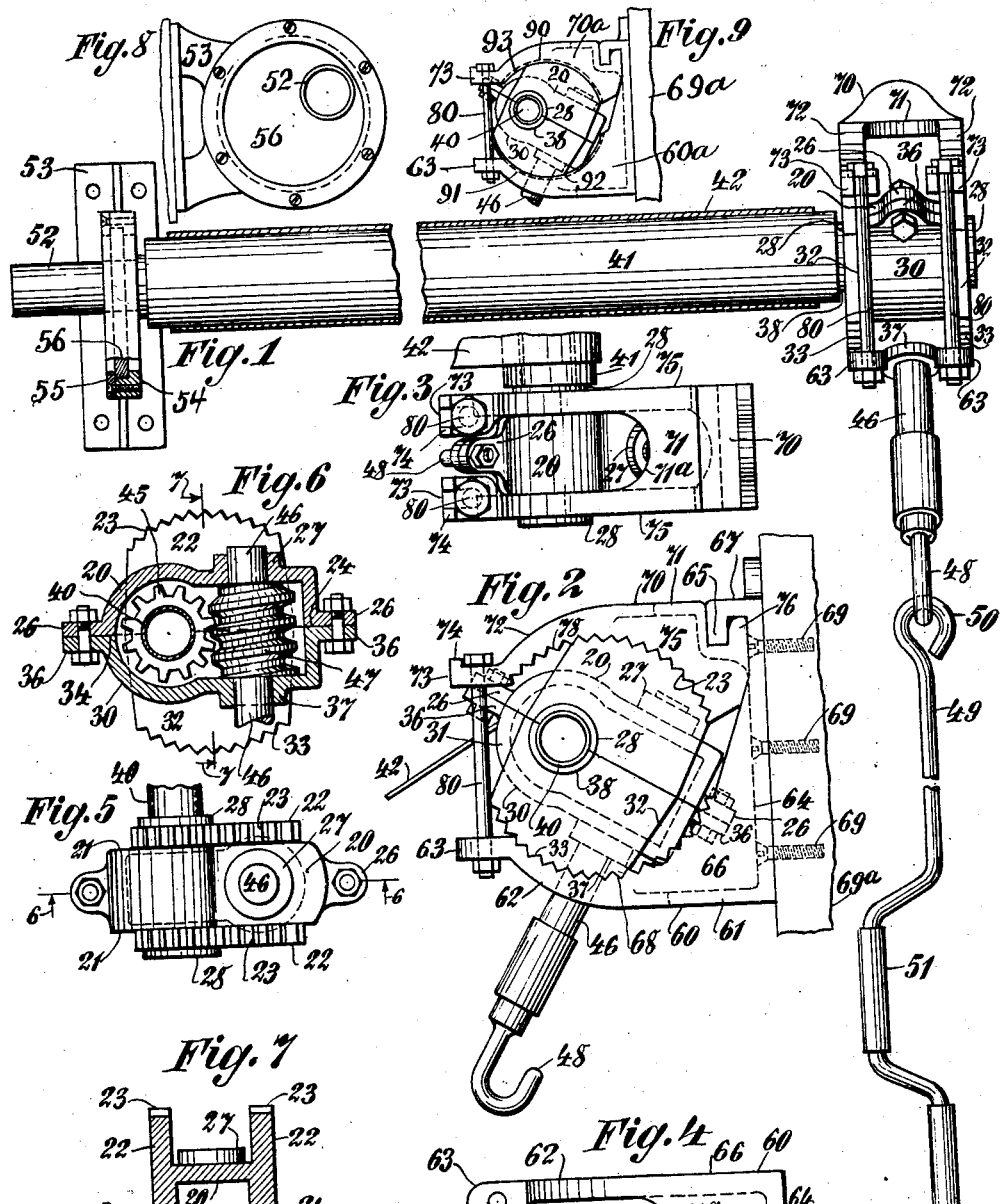

1,744,686

UNITED STATES PATENT OFFICE

ORVILLE E. PEASE, OF BALDWIN, NEW YORK, AND NORBERT G. JOSEPH, OF BOGOTA, NEW JERSEY, ASSIGNORS TO F. J. KLOES, INC., OF NEW YORK, N. Y., A CORPORATION OF NEW YORK

UNIVERSAL SUPPORT AND GEAR CASING

Application filed May 15, 1928. Serial No. 277,956.

This invention relates to a universal support and a gear casing.

The object of the invention is the production of a universal support and a gear casing, which latter is adapted to maintain the casing in different angular positions, as may be required when a curtain or awning roller associated with the casing is located within a transom or other enclosure, and the operating shaft of the gear takes an inclined direction, to extend through an opening in the transom or other enclosure, or where for other reasons it is desirable to maintain said shaft in an inclined direction.

In the accompanying drawings Fig. 1 represents a front elevation of an exemplification of our universal support with its appurtenances, an awning roller with its appurtenances and its awning in longitudinal section; Fig. 2 shows a right hand side view of Fig. 1 with the support secured to a wall; Fig. 3 indicates a top plan view of Fig. 2; Fig. 4 shows a bottom plan view of the support; Fig. 5 represents a top plan view of the gear casing removed from its support; Fig. 6 shows a section of Fig. 5 on the line 6, 6; Fig. 7 represents a section of Fig. 6 on the line 7, 7; Fig. 8 indicates a left hand side view of Fig. 1 on a reduced scale and Fig. 9 shows a view similar to Fig. 2 with a modification.

The gear casing in this instance constitutes a worm gear casing, comprising the upper member designated in its entirety by the numeral 20, and the lower member is designated in its entirety by the numeral 30.

The side walls of the member 20 are indicated at 21 and have projecting therefrom the flanges 22 having the top ends with the teeth 23. The lower face of the member 20 is indicated at 24 and the top ends of the teeth 23 and the lower ends of the spaces between them are located in circles which have their center on the intersection of the center line 7, 7 and the face 24, which are at right angles to each other. Flanges 26 and journal bearings 27 and 28 are formed with the members 20.

The side walls of the member 30 are indicated at 31 and have projecting therefrom the flanges 32 diametrically opposite the flanges 22, having the lower ends with the teeth 33 similar to 23. The upper face of the member 30 is indicated at 34. Flanges 36, and journal bearings 37 and 38 are formed with the member 30.

A sleeve 40 has one end journaled in the journal bearings 28 and 38 and extends into the awning roller 41 to which it is fastened. An awning 42 has one end fastened to the roller 41 in the usual manner. A worm wheel 45 is fastened to the sleeve 40 within the worm gear casing. An operating shaft 46 is journaled in the journal bearings 27 and 37 and has fastened thereto within the worm gear casing the worm 47, which meshes with the worm wheel 45. A hook 48 is fastened to the shaft 46. An operating rod 49 is shown with the hook 50 and the handle 51. The roller 41 has a second sleeve 52 similar to 40 at its end opposite. A journal bracket 53 has formed therewith the housing 54 with the detachable ring 55. A disc 56 is detachably supported in the housing 54, and the sleeve 52 is journaled in the disc 56.

The universal support for the worm gear casing comprises the main member indicated in its entirety by the numeral 60, and the detachable upper member or cap indicated in its entirety by the numeral 70.

The member 60 comprises the bottom wall 61 having the curved inner edge 61ª from which extend the arms 62, that terminate in the lugs 63. The vertical rear wall 64 extends from the wall 61 and terminates in the hook end 65. The side walls of the member 60 are shown at 66 and the top wall at 67. Teeth 68 are formed at the upper edges of the walls 66 and arms 62, which teeth are disposed and formed to engage the teeth 33.

The cap or upper member 70 comprises the top wall 71 having the curved inner edge 71ª, from which extend the arms 72 that terminate in the lugs 73 having the projections 74. The side walls of the cap are shown at 75, and said side walls 75 and the top wall 71 terminate in the hook end 76, which detachably locks with the hooks end 65. Teeth 78 are formed with the lower edges of the walls 75 and the arms 72. Bolts 80 extend between and connect the lugs 63 and 73.

Screws 69 extend through the wall 64 of the main member 60 to secure it in a support 69ª.

To locate the gear casing in different positions the bolts 80 are removed from the support and the member 70 is detached from the member 60. The teeth 23 and 33 are then separated from the teeth 78 and 68, and the gear casing is located in its desired position, with its teeth engaging the teeth of the support in the changed position. Next the bolts 80 are again secured in place.

It will be noted that the casing can be located in its support with its teeth 33 in engagement with the teeth 78 and the teeth 23 in engagement with the teeth 68, thereby locating the operating shaft in an upwardly direction.

The support with its casing can also be located at the other end of the awning roller 41, to function with the sleeve 52. The curved inner edge 61ª of the wall 61 of the main member 60 of the support, and the curved inner edge 71ª of the top wall 71 of the upper member 70 may be much closer to the rear walls of said members than is shown in the drawings, to enable a farther range of the angular direction of the operating shaft 46. It is to be understood that the gears in the gear casing are not limited to a worm and worm wheel, and that various other gears may be substituted.

In Fig. 9 the worm gear casing is indicated having the upper member 20 and the lower member 30. The side walls of the member 20 have extending therefrom flanges with the circular edges 90 devoid of teeth. The members 30 have extending therefrom flanges with the circular edges 91. The centers for the said curved edges are the same as described for the teeth 23. The journal bearings 28 and 38 are again indicated for the sleeve 40. The operating shaft is indicated at 46. The main member of the support for the worm gear casing is shown at 60ª with the lug 63 and the detachable upper cap is shown at 70ª with the lug 73. The member 60ª has formed therein the circular groove 92 for the circular edge 91, and the member 70ª has formed therein the circular groove 93 for the circular edge 90. The bolts 80 extend between and connect the lugs 63 and 73. A wall for supporting the main member 60ª is again indicated at 69ª.

To locate the gear casing shown in Fig. 9 in different positions the operation is the same as already described with the exception that no teeth have to be located in mesh.

In both forms of the invention the disc 56 has to be located in proper position for the sleeve 52.

Various modifications may be made in the invention and the present exemplification is to be taken as illustrative and not limitative thereof.

Having described our invention what we desire to secure by Letters Patent and claim is:

1. The combination of a gear casing and a support for the casing, said support comprising a pair of detachable members, a hook end formed with each of the members of the support adapted to lock with each other, said gear casing and the members of the support gear casing and teeth formed therewith, the teeth all having teeth formed therewith, the teeth of the support and the casing adapted to lock with each other in different angular positions of the casing.

2. The combination of a gear casing and a support for the casing, said support comprising a pair of detachable members, a hook end formed with each of the members of the support adapted to lock with each other, means to maintain said members in locked position, and means formed with the members of the support and the gear casing to maintain the latter in different angular positions.

3. The combination of a gear casing and a support for the casing, said support comprising a main member and a detachable upper member, side walls formed with each of said members of the support, an arm formed with each of said side walls, teeth at the lower edges of the side walls of the upper member and its arms, teeth formed at the upper edges of the side walls of the main member and its arms, teeth formed with the casing adapted to engage the teeth of the members of the support to maintain said casing in different angular positions, and means to lock and maintain the members of the support in clamped position.

4. The combination, of a gear casing comprising an upper member and a lower member, means to detachably fasten said members to each other, side walls for each member of the gear casing, flanges formed with the side walls of one member and diametrically opposite flanges formed with the side walls of the other member, teeth formed at the outer end of each of said flanges, a support for the gear casing comprising a main member and a detachable upper member, teeth formed with each member of the support adapted to engage the teeth of the flanges of the casing, with the latter in one position or in a position reversed thereto and detachable locking means associated with the members of the support.

5. The combination of a gear casing comprising an upper member and a lower member, means to detachably fasten the members of the casing to each other, side walls for each member, flanges formed with the side walls of one member and diametrically opposite flanges formed with the side walls of the other member, teeth formed at the outer ends of each of said flanges, a support for the gear casing comprising a main member and a detachable upper member, teeth formed with each member of the support adapted to engage the teeth of the flanges of the casing in different angular positions thereof, a hook end for each of the members of the support, adapted to lock with each other, bolts to connect the members of the support, a worm wheel in the casing, means to connect one end of an awning roller to said worm wheel, a worm in the casing in mesh with said worm wheel, and an operating shaft extending from said worm between and beyond the side walls of said support, said support adapted for various inclined positions of said casing and its operating shaft.

6. The combination of a worm gear casing comprising detachable connected upper and lower members, teeth formed with each of said members, a support for the gear casing comprising a main member and a detachable upper member, teeth formed with each member of the support adapted to engage the teeth of the casing in different angular positions thereof, a hook end for each of the members of the support adapted to lock with each other, a worm wheel journaled in the casing, an awning roller in connection with the worm wheel, a worm in the casing in mesh with said worm wheel, an operating shaft extending from the worm and extending between and beyond the side walls of said support, said support adapted for various inclined positions of the casing and its operating shaft and an operating rod coacting with said operating shaft.

In testimony whereof we affix our signatures.

ORVILLE E. PEASE.
NORBERT G. JOSEPH.